(12) United States Patent
Boehm et al.

(10) Patent No.: US 9,809,249 B2
(45) Date of Patent: Nov. 7, 2017

(54) DEVICE FOR THE STEERING ASSISTANCE OF A VEHICLE COMBINATION

(71) Applicant: DEERE & COMPANY, Moline, IL (US)

(72) Inventors: Barbara Boehm, Heidelberg (DE); Rainer Gugel, Plankstadt (DE); Norbert Fritz, Ilvesheim (DE); Marco Reinards, Gruenstadt (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/083,739

(22) Filed: Mar. 29, 2016

(65) Prior Publication Data

US 2016/0339951 A1  Nov. 24, 2016

(30) Foreign Application Priority Data

Mar. 18, 2015 (DE) ........................ 10 2015 204 892

(51) Int. Cl.
*B62D 6/00* (2006.01)
*B62D 13/00* (2006.01)
(Continued)

(52) U.S. Cl.
CPC ............... *B62D 6/005* (2013.01); *B62D 6/02* (2013.01); *B62D 11/00* (2013.01); *B62D 11/02* (2013.01);
(Continued)

(58) Field of Classification Search
CPC combination set(s) only.
See application file for complete search history.

(56) References Cited

U.S. PATENT DOCUMENTS 3,834,480 A * 9/1974 McGee ................. B62D 13/00
180/419
4,650,018 A * 3/1987 Silverman, Sr. ....... B62D 59/04
180/14.7
(Continued)

FOREIGN PATENT DOCUMENTS

DE   3535225 A1   4/1986
DE   4133912 C2   4/1993
(Continued)

OTHER PUBLICATIONS

German Search report issued in counterpart application No. 102015204892.6 dated Dec. 1, 2016 (12 pages).
(Continued)

*Primary Examiner* — Yonel Beaulieu

(57) ABSTRACT

A device for the steering assistance of a vehicle combination of a towing vehicle and an attached implement in which the attached implement swivels at a rear coupling point of the towing vehicle. The implement includes wheels that are arranged on opposite sides, which can be acted on by the control of corresponding individual wheel drives, independently of one another, with a drive torque. An electronic control unit applies a yawing moment to the implement by the asymmetrical control of the individual wheel drives in such a way that a transverse force exerted on the towing vehicle through the rear coupling point, builds up in the sense of the attainment of a pre-specified steering behavior of the vehicle combination.

10 Claims, 2 Drawing Sheets

(51) Int. Cl.
*A01B 59/00* (2006.01)
*B60D 1/00* (2006.01)
*B62D 11/00* (2006.01)
*B62D 6/02* (2006.01)
*B62D 11/02* (2006.01)
*B62D 12/02* (2006.01)

(52) U.S. Cl.
CPC ........... B62D 12/02 (2013.01); B62D 13/005 (2013.01); *B60Y 2200/221* (2013.01); *B60Y 2300/28* (2013.01)

(56) References Cited

U.S. PATENT DOCUMENTS

| | | | | |
|---|---|---|---|---|
| 5,194,851 | A * | 3/1993 | Kraning | B62D 7/1509 180/415 |
| 7,497,457 | B2 * | 3/2009 | Jamieson | B60D 1/06 280/441.2 |
| 7,823,902 | B2 * | 11/2010 | Jamieson | B60D 1/06 280/460.1 |
| 8,042,825 | B2 * | 10/2011 | Jamieson | B60D 1/06 280/460.1 |
| 9,102,271 | B2 * | 8/2015 | Trombley | B60R 1/00 |
| 2004/0249547 | A1 * | 12/2004 | Nenninger | B60T 8/1708 701/70 |
| 2005/0000738 | A1 | 1/2005 | Gehring et al. | |
| 2010/0318241 | A1 | 12/2010 | Post, II et al. | |
| 2015/0051795 | A1 | 2/2015 | Keys, II et al. | |
| 2016/0039456 | A1 * | 2/2016 | Lavoie | B62D 15/027 701/41 |
| 2017/0008357 | A1 * | 1/2017 | Sallis, Sr. | B60D 1/30 |

FOREIGN PATENT DOCUMENTS

| | | |
|---|---|---|
| DE | 102010031158 A1 | 1/2012 |
| EP | 2774828 A2 | 9/2014 |
| JP | H10157652 A | 6/1998 |

OTHER PUBLICATIONS

European Search Report in foreign counterpart application No. 16160924.3 dated Jul. 25, 2016 (8 pages).

* cited by examiner

DEVICE FOR THE STEERING ASSISTANCE OF A VEHICLE COMBINATION

RELATED APPLICATION

This application claims priority to German Application Ser. No. DE 102015204892.6 filed on Mar. 18, 2015, which is hereby expressly incorporated by reference in its entirety.

FIELD OF THE DISCLOSURE

The present disclosure relates to a device for the steering assistance of a vehicle combination of a towing vehicle and an attached implement.

BACKGROUND

A device for steering assistance can be found, for example, in DE 41 33 912 A1, in which the device is used to influence the steering behavior of a trailer used in a vehicle combination. The trailer, which is attached on a towing vehicle of the vehicle combination by means of a tow bar, has right and left drive wheels on an axle that is rigidly connected with the tow bar, which can be driven by means of separate electric motors. Among other things, information regarding a steering angle, that is adjusted on steerable front wheels of the towing vehicle, and a forward movement speed of the towing vehicle is supplied to an electronic steering device. The electronic steering device determines a theoretical steering angle corresponding to an ideal trailer operation on the basis of the information supplied and makes adjustments by a suitable control of the electric motors on the trailer.

Regardless of any attained steering capabilities of the vehicle combination, the trailer load, which in the rear section, acts on the towing vehicle in the vertical direction, inevitably leads to a reduction of the traction. Thus, the cornering forces in the area of the steerable front wheels of the towing vehicle are reduced as well. In order to take into consideration these forces, it is known, in the agricultural area, to set up a ballast with additional front weights on the towing vehicle. The resulting weight increase leads not only to an increased compression of farmland traversed by the vehicle combination or to a corresponding reduction of the load capacity, but also to a top-heavy steering behavior of the towing vehicle. The steering behavior is thus changed in an unpredictable manner which can be particularly perceived when the trailer is removed.

SUMMARY

The present disclosure provides a device for the steering assistance of a vehicle combination with a towing vehicle and an attached implement, so that the implement can swivel on the towing vehicle in a rear coupling point. The implement includes wheels which are arranged on opposite sides and which can receive the application of a driving torque by the control of corresponding individual wheel drives, independently of one another.

In one or more embodiments of the present disclosure, there is provided a device including a steering behavior of the towing vehicle and thus the vehicle combination.

The device for the steering assistance of a vehicle combination includes a towing vehicle and an implement that is attached to the towing vehicle, so it can swivel in a rear coupling point, wherein the implement has wheels, arranged on opposite sides. The wheels receive the application of a driving torque by the control of corresponding individual wheel drives independent of one another. An electronic control unit is configured to characterize the implement with a yawing moment $\Gamma$ by the asymmetrical control of the individual wheel drives. The characterization is provided in such a way that a transverse force $F_{transverse}$, exerted via the rear coupling point on the towing vehicle, builds up in the sense of the attainment of a pre-specified steering behavior of the vehicle combination.

The device in accordance with the present disclosure thereby utilizes the fact that the towing vehicle can be purposefully steered by the implement via the coupling point in the rear section. The coupling point enables an indirect influencing of the steering behavior of the towing vehicle. With a suitable specification of the yawing moment $\Gamma$ applied on the implement, therefore, it is possible to correct the steering behavior of the towing vehicle. The correction, in one embodiment, is made in the sense of a balancing of the reduced cornering forces on its steerable front wheels. The need for a ballast with front weights is superfluous in such a case.

The steering behavior of the vehicle combination to be attained can be specified, for example, on the basis of various theoretical values of steering-specific driving dynamic variables. In this regard, it is possible to design the device in accordance with the present disclosure in various ways.

Thus, in accordance with one embodiment of the device of the present disclosure and proceeding from a sensor-detected real value $\delta_{real}$ of a steering angle magnitude which gives a wheel steering angle assumed on steerable wheels of the towing vehicle, the electronic control unit is configured to calculate a theoretical value $\alpha_{theoretical}$ of an articulated angle magnitude. This value provides an articulated angle between the towing vehicle and the implement. The electronic control unit is configured to compare the calculated theoretical value $\alpha_{theoretical}$ with a real value $\alpha_{real}$, which is determined by a sensor for the articulated angle magnitude. The application of the yawing moment $\Gamma$ takes place by asymmetrical control of the individual wheel drives, with the goal of adapting the real value $\alpha_{real}$ of the articulated angle magnitude to the calculated theoretical value $\alpha_{theoretical}$.

The calculation of the theoretical value $\alpha_{theoretical}$ of the articulated angle magnitude is carried out in such a way that during the traveling of the vehicle combination, a curve path that follows the real value $\delta_{real}$ of the steering angle magnitude and thus the steering specifications of a vehicle operator is established. The adjustment thereby carried out between the real value $\alpha_{real}$ and the theoretical value $\alpha_{theoretical}$ of the articulated angle magnitude is provided by a regulation algorithm stored in the electronic control unit.

A steering angle sensor is provided for the sensor determination of the real value $\delta_{real}$ of the articulated angle magnitude. The steering angle sensor signals are supplied to the electronic control unit, together with those of an articulated angle sensor, which is used for the sensor determination of the real value $\alpha_{real}$ of the articulated angle magnitude, for the corresponding control of the individual wheel drives.

The steering angle sensor or the articulated angle sensor can be linear encoders in the form of potentiometers or incremental encoders. In one embodiment, for reasons having to do with sturdiness, however, a contactless determination of the real value $\alpha_{real}$ of the articulated angle magnitude is used in the case of the articulated angle sensor. This can take place, for example, by using imaging detectors, such as a laser scanner or radar sensors, which are located in the rear section of the towing vehicle, in order to determine the relative position of the implement attached thereon. Alternately, it is also possible to have a sensor determination of the yaw rates of the towing vehicle and the implement or equivalent magnitudes, such as wheel speed differences which appear on non-driven wheels of the towing vehicle and the implement. These wheel speed differences form the basis for a calculation derivation of the real value $\alpha_{real}$ of the articulated angle magnitude, using corresponding kinematic and geometric considerations (Ackermann conditions).

Furthermore, in another embodiment, the adjustment of the real value $\alpha_{real}$ of the articulated angle magnitude to the calculated theoretical value $\alpha_{theoretical}$ takes place by applying the yawing moment $\Gamma$ not only during the traveling, but rather also when the vehicle combination is standing still. In this adjustment, a maneuvering or turning is simplified, above all with narrow space conditions.

In accordance with another embodiment of the device of the present disclosure, and proceeding from a sensor-determined real value $\delta_{real}$ of a steering angle magnitude, which gives a wheel steering angle assumed on steerable wheels of the towing vehicle, the electronic control unit is configured to determine a theoretical value $\gamma_{theoretical}$ of a yaw rate magnitude. This value is determined as a function of a sensor-determined real value $v_{real}$ of a traveling speed magnitude, which gives a forward movement speed of the towing vehicle. This value provides a temporal yaw angle change around the vertical axis of the towing vehicle. The application of the yawing moment $\Gamma$ is carried out in this case by the asymmetrical control of the individual wheel drives, with the goal of adapting the real value $\gamma_{real}$ of the yaw rate magnitude to the calculated theoretical value $\gamma_{theoretical}$.

In this case, the calculated theoretical value $\gamma_{theoretical}$ of the yaw rate magnitude corresponds to the curve path which is determined in view of the real forward movement speed of the vehicle combination and the steering specifications of the vehicle operator. The adaptation between the real value $\gamma_{real}$ and the theoretical value $\gamma_{theoretical}$ of the yaw rate magnitude, is carried out by a regulation algorithm, provided in the electronic control unit. The adaptation brings about a stabilization of the vehicle combination when passing through a curve or during the execution of an evasive maneuver, wherein an undesired oversteering or understeering is suppressed.

A yaw rate sensor, which is coordinated with the towing vehicle and which in one embodiment is designed as a gyroscope, is used for the sensor determination of the real value $\gamma_{real}$ of the yaw rate magnitude. The electronic control unit is provided with sensor signals made available by the yaw rate sensor. The electronic control unit is also provided with sensor signals of a steering angle sensor, for the sensor determination of the real value $\gamma_{real}$ of the steering angle magnitude, and from wheel speed sensors, for the derivation of the real value $\gamma_{real}$ of the traveling speed magnitude, for the corresponding control of the individual wheel drives.

In accordance with another embodiment of the device of the present disclosure, and proceeding from a sensor-determined real value $\delta_{real}$ of a steering angle magnitude, which gives a wheel steering angle assumed on steerable wheels of the towing vehicle, the electronic control device determines a theoretical course D (s) of a curve path to be traversed. The application of the yawing moment $\Gamma$ hereby takes place by the asymmetrical control of the individual wheel drives in accordance with the determined theoretical course D (s). For example, asymmetrical speed offsets for the control of the individual wheel drives, calculated with the aid of the determined theoretical course D (s), are specified by the electronic control unit. The specification of the speed offsets can take place on the basis of a control curve, deposited in the electronic control unit into which the determined theoretical course D (s) is entered as a control parameter.

The determination of a theoretical course D (s) to be maintained by the vehicle combination is, moreover, a drifting of the implement, directed down to a valley, in contrast to the towing vehicle, when moving along a slope. This is important, for example, in the holding of a swath laid on a field by means of an implement designed as a loader wagon, since here, the vehicle combination should, if possible, follow the course of the swath in the middle. The maintenance of the theoretical course D (s) can be supported by undertaking corresponding operator-independent steering interventions on the steerable wheels of the towing vehicle.

Moreover, in another embodiment, a GPS-aided adaptation of the theoretical course D (s) or a corresponding parameterization of the control curve, stored in the electronic control unit, is provided in order to take into consideration a road section lying ahead in the traveling direction with regard to possible danger sites, changes of the course of the road, and the like. This may help with road transport in the agricultural area because of the comparatively high transported loads.

Independent of the individual development of the device in accordance with the present disclosure, the steering angle magnitude either describes directly the wheel steering angle assumed on the steerable wheels of the towing vehicle or a corresponding magnitude, for example, the position of a steering handle, in the form of a steering wheel, provided in the towing vehicle.

The electronic control unit can also undertake operator-independent steering interventions on the towing vehicle for the application of the yawing moment $\Gamma$. These appear in the case of larger direction corrections if such corrections cannot be carried out on the basis of a single control of the individual wheel drives. The operator-independent steering interventions can be carried out either by the activation of an additional steering torque acting on the steering handle, which is produced by means of an electrically steerable steering torque transmitter, or by means of an overlapping steering. The use of a steering torque transmitter makes it possible for the vehicle operator to retain, at any time, the control over the steering of the vehicle combination and to counter the steering interventions by oversteering the additional steering torque activated on the steering handle.

Furthermore, carrying out the application of the yawing moment $\Gamma$ during the execution of a maneuvering or turning procedure in the sense of attaining an oversteering behavior of the vehicle combination can also be provided. An oversteering behavior can be produced by the purposeful enlargement of the articulated angle between the towing vehicle and the implement, so that a curve path that deviates from the position of the steering handle and constricts the turning circle is passed through. Depending on the development of the device in accordance with the present disclosure, this can occur either directly with the specification of an increased theoretical value $\alpha'_{theoretical} > \alpha_{theoretical}$ for the articulated angle magnitude, or indirectly with a corresponding modification of the theoretical value $\gamma_{theoretical}$, specified for the yaw rate magnitude or the theoretical course D (s) of the curve path that is to be passed through.

The maneuvering and/or turning procedure can be controlled, for example, from the outside, via a wireless remote control that communicates with the electronic control unit, so that the vehicle operator receives an overview of the maneuvering and/or turning procedure. The wireless remote control is typically a smart phone or a tablet that is connected with the electronic control unit via a WLAN or Bluetooth interface.

Moreover, in the case of carrying out a backward movement of the vehicle combination in one embodiment, the electronic control unit puts the implement in a traction mode by activating a drive torque increase, which is undertaken on both sides of the individual wheel drives. In other words, the implement then assumes the management function within the vehicle combination, wherein an undesired buckling of the vehicle combination can be reliably prevented by maintaining a predetermined traction force that acts on the rear coupling point. In this case, the steering of the towing vehicle can be activated without any force, so that the steerable wheels, by themselves, follow the pulling direction specified by the implement. In contrast to this, however, operator-independent steering interventions on the steerable wheels of the towing vehicle that correspond to the pulling direction are also provided.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
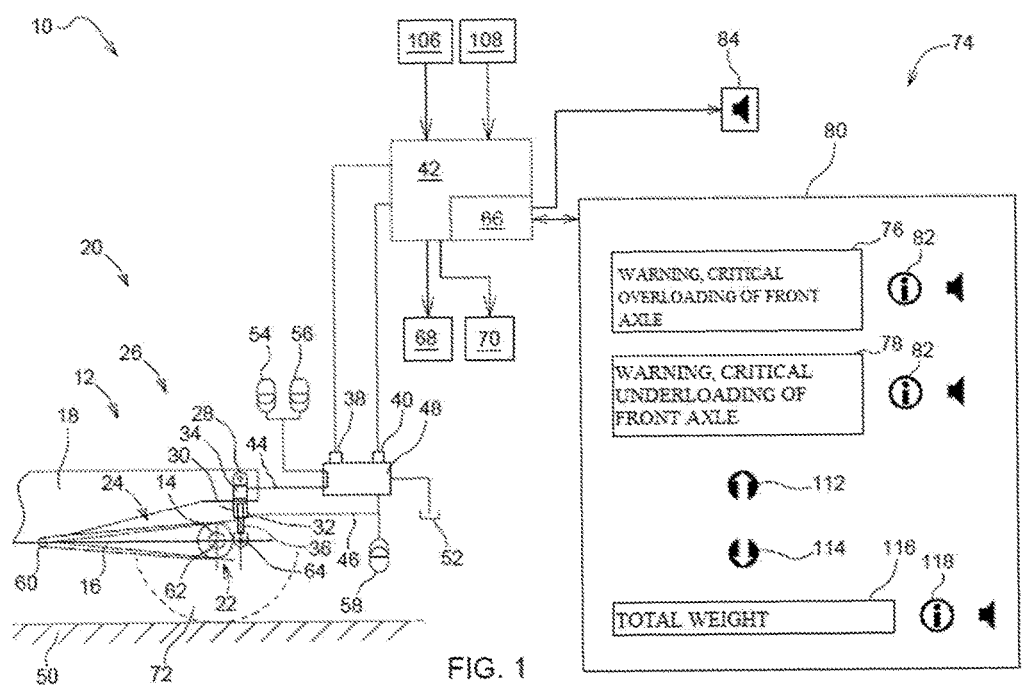
FIG. 1 illustrates a vehicle combination with a towing vehicle and an implement attached thereon.

FIG. 1 shows a vehicle combination 10, which comprises a towing vehicle 12 and an implement 16 that is attached so it can swivel in a rear coupling point 14. In the present embodiment, the towing vehicle 12 is provided in the form of an agricultural tractor 18, on which the implement 16, designed as a transport trailer 20, is placed by means of a rigid tow bar 22.

The agricultural tractor 18 has a traditional design and, in addition to a combustion engine 24 and a downstream differential gear 26 for the driving of corresponding rear wheels 28, 30, comprises a steering handle 32 in the form of a steering wheel. The steering wheel is provided in a non-depicted driver's cabin and is used so the operator can influence a wheel steering angle that can be adjusted on steerable front wheels 34, 36.

The transport trailer 20 is a biaxial loader wagon. The illustrated wagon has right and left wheels 38, 40, 42, 44 arranged on opposite sides, which can be acted on, independently of one another, by controlling corresponding individual wheel drives 46, 48, 50, 52 with a drive torque Mr1, Mr2, Ml1, Ml2. The control is carried out by the agricultural tractor 18. Here, it should be noted that the depiction of a transport trailer 20, designed as a biaxial loader wagon, has merely the character of an example; rather, it can also be any other uniaxial or multiaxial implement 16, wherein, in addition to driven wheels, it can also have non-driven wheels.

Figure 2:
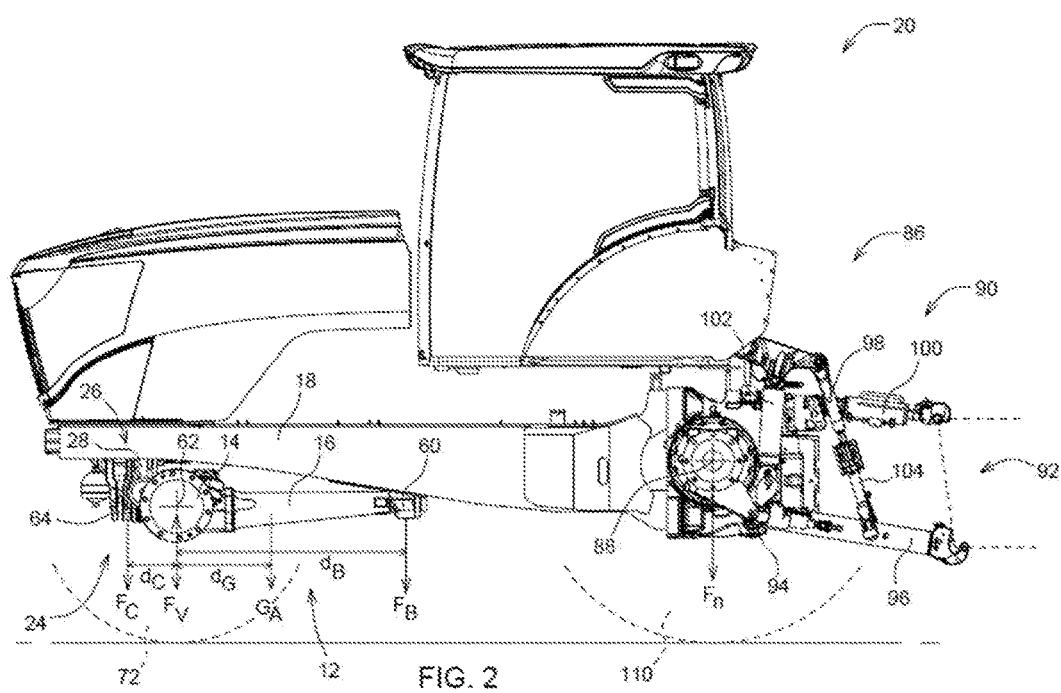
FIG. 2 is a schematic depiction of an embodiment of the device in accordance with the present disclosure for the steering support of the vehicle combination shown in FIG. 1.

FIG. 2 shows a schematically depicted embodiment of the device in accordance with the present disclosure for the steering assistance of a vehicle combination whose mode of functioning will be explained below, with reference to FIG. 1.

In addition to an electronic (microprocessor-managed) control unit 56, correlated with the agricultural tractor, the device 54 has a number of sensors 58, 60, 62, 64. The sensor signals are supplied to the electronic control unit 56 for the evaluation and corresponding control of the individual drives 46, 48, 50, 52. A steering angle sensor 58 is provided for the sensor determination of a real value $\delta_{real}$ of a steering angle magnitude, which gives a wheel steering angle assumed on the steerable front wheels 34, 36 of the agricultural tractor 18. An articulated angle sensor 60 is provided for the sensor determination of a real value $\alpha_{real}$ of an articulated angle magnitude, which gives an articulated angle present between the agricultural tractor 18 and the transport trailer 20. Wheel speed sensors 62 are provided for the derivation of a real value $v_{real}$ of a traveling speed magnitude, which gives a forward movement speed of the agricultural tractor 18. A yaw rate sensor 64, designed as a gyroscope in one embodiment, provides a temporal yaw angle change around the vertical axis of the agricultural tractor 18. The steering angle magnitude either directly describes the wheel steering angle assumed on the steerable front wheels 34, 36 or a corresponding parameter, for example, the position of the steering handle 32, provided in the agricultural tractor 18.

In the case of an agricultural tractor 18 equipped with an automatic steering system, the aforementioned sensors 58, 60, 62, 64 can be included, so that they can also be used at low cost for the purpose of the steering assistance of the vehicle combination 10.

Via an operating element 66, it is possible to put the electronic control unit 56 into an assist mode for the steering assistance. In this case, the electronic control unit 56 applies a yawing moment Γ to the transport trailer 20 by the asymmetrical control of the individual wheel drives 46, 48, 50, 52, producing corresponding drive torques Mr1, Mr2>Ml1, Ml2. This is provided in such a way that a transverse force $F_{transverse}$, exerted via the rear coupling point 14 on the agricultural tractor 18, is built up in the sense of the attainment of a specified steering behavior of the vehicle combination 10.

Alternately, for the application of the yawing moment Γ, it is possible to produce a positive (accelerating) drive torque Mr1, Mr2>0 on the right wheels 38, 40 of the transport trailer 20 and a negative (delaying) drive torque Ml1, Mr2<0 on the left wheels 42, 44 of the transport trailer 20. Likewise, it is possible to produce a positive drive torque Mr1>0 or Mr2>0 on only one of the two right wheels 38 or 40 and to put the other wheels into a freely running state.

The device 54 makes use of the fact that the agricultural tractor 18 can be purposefully steered by the transport trailer 20 via the coupling point 14 in the rear section, which permits an indirect influencing of the steering behavior of the agricultural tractor 18.

The steering behavior of the vehicle combination 10 to be attained can be specified on the basis of various theoretical values of steering-specific driving-dynamic magnitudes. In this regard, the device 54 is developed in different ways.

In accordance with one embodiment of the device 54 and proceeding from the sensor-determined real value $\delta_{real}$ of the steering angle magnitude, the electronic control unit 56 calculates a theoretical value $\alpha_{theoretical}$ for the articulated angle magnitude and compares it with the sensor-determined real value $\alpha_{real}$. the application of the yawing moment Γ by the asymmetrical control of the individual wheel drives 46, 48, 50, 52 takes place with the goal of adapting the real value $\alpha_{real}$ of the articulated angle magnitude to the calculated theoretical value $\alpha_{theoretical}$.

The calculation of the theoretical value $\alpha_{theoretical}$ of the articulated angle magnitude is carried out in such a way that during the travel of the vehicle combination 10, a curve path following the real value $\delta_{real}$ of the steering angle magnitude and thus the steering specification of a vehicle operator is established.

The adaptation of the real value $\alpha_{real}$ of the articulated angle magnitude to the calculated theoretical value $\alpha_{theoretical}$, which is carried out by means of a regulation algorithm stored in the electronic control unit 56, takes place hereby not only during travel, but also when the vehicle combination 10 is standing still. A maneuvering or turning is thereby simplified, above all with constricted space conditions.

In accordance with another embodiment of the device 54 and proceeding from the sensor-determined real value $\delta_{real}$ of the steering angle magnitude, as a function of the sensor-determined real value $v_{real}$ of the traveling speed magnitude, the electronic control unit 56 calculates a theoretical value $\gamma_{theoretical}$ for the yaw rate magnitude. In this embodiment, the application of the yawing moment Γ takes place by the asymmetrical control of the individual wheel drives 46, 48, 50, 52 with the goal of adapting the real value $\gamma_{real}$ of the yaw rate magnitude to the calculated theoretical value $\gamma_{theoretical}$.

In this embodiment, the calculated theoretical value $\gamma_{theoretical}$ of the yaw rate magnitude corresponds to the curve path to be expected in view of the real forward movement speed of the vehicle combination 10 and the steering specifications of the vehicle operator. The adaptation between the real value $\gamma_{real}$ and the theoretical value $\gamma_{theoretical}$ of the yaw rate magnitude, which is carried out by means of a regulation algorithm stored in the electronic control unit 56, therefore brings about a stabilization of the vehicle combination 10 when passing through a curve or when executing an evasion maneuver. An undesired oversteering or understeering is thereby suppressed.

In accordance with another embodiment of the device 54 and proceeding from the sensor-determined real value $\delta_{real}$ of the steering angle magnitude, the electronic control unit 56 determines a theoretical course D (s) of a curve path to be traversed. The application of the yawing moment Γ hereby takes place by the asymmetrical control of the individual wheel drives 46, 48, 50, 52 in accordance with the determined theoretical course D (s). Asymmetrical speed offsets calculated by the electronic control unit 56, with the aid of the determined theoretical course 56, are specified for the control of the individual wheel drives 46, 48, 50, 52. The specification of the speed offsets takes place on the basis of a control curve stored in the electronic control unit 56, into which the determined theoretical course D (s) is entered as a control parameter.

Moreover, the electronic control unit 56 undertakes a GPS-aided adaptation of the theoretical course D (s) or a corresponding parameterization of the control curve stored in the electronic control unit, by means of position and environment information prepared by a GPS system 68, for example. The control unit 56 thereby takes into consideration a road section lying ahead in the traveling direction with regard to possible danger sites, changes of the road course, or the like.

Optionally, for the application of the yawing moment Γ, the electronic control unit 56 also undertakes operator-independent steering interventions on the agricultural tractor 18. These appear in the case of larger direction corrections if they cannot be carried out on the basis of a single control of the individual wheel drives 46, 48, 50, 52. The operator-independent steering interventions take place in this case by the application of an additional steering torque acting on the steering handle 32, which is produced by means of an electrically controllable steering torque transmitter 70. The use of a steering torque transmitter 70 makes it possible for the vehicle operator to retain, at any time, control over the steering of the vehicle combination 10 and to counter the steering interventions by oversteering the additional steering torque applied on the steering handle 32.

Furthermore, the application of the yawing moment Γ takes place during the execution of a maneuvering or turning procedure in the sense of the attainment of an oversteering behavior of the vehicle combination 10. The electronic control unit 56 recognizes the carrying out of a maneuvering and/or turning procedure with the aid of steering specifications of the vehicle operator that are characteristic for the purpose, such as a maximum steering movement. An oversteering behavior can be produced by a purposeful enlargement of the articulated angle between the agricultural tractor 18 and the transport trailer 20, so that a curve path that deviates from the position of the steering handle 32 and constricts the turning circle is traversed. Depending on the device 54, this happens either directly by the specification of an increased theoretical value $\alpha'_{theoretical} > \alpha_{theoretical}$ for the articulated angle magnitude or indirectly by a corresponding modification of the theoretical value $\gamma_{theoretical}$ or the theoretical course D (s) of the curve path to be traversed, as specified for the yaw rate magnitude.

The maneuvering or turning procedure can be controlled from the outside via a radio remote control 72 that communicates with the electronic control unit 56, so that the vehicle operator receives an overview regarding the maneuvering and/or turning procedure. The radio remote control 72, in different embodiments, is a smart phone or a tablet, which is connected with the electronic control unit 56 via a WLAN or Bluetooth interface 74.

In addition, the electronic control unit 56 puts the transport trailer 20 into a traction mode in the case of the execution of a backward movement of the vehicle combination 10. This mode is made by activating a drive torque increase, which is undertaken on both sides of the individual wheel drives 46, 48, 50, 52. The transport trailer 20 takes over the management function within the vehicle combination 10, wherein by maintaining a predetermined traction force acting on the rear coupling point 14, a buckling of the vehicle combination 10 is reliably prevented. In this case, the steering of the agricultural tractor 18 is activated free of force, so that the steerable wheels 34, 36, by themselves, follow the pulling direction specified by the transport trailer 20. Alternately, the control unit 56 undertakes operator-independent steering interventions, corresponding to the pulling direction, on the steerable wheels 34, 36 of the agricultural tractor 18 by the suitable control of the steering torque transmitter 70.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A device for the steering assistance of a vehicle combination having a towing vehicle and an attached implement which swivels on the towing vehicle at a rear coupling point, wherein the implement has wheels that are arranged on opposite sides and that can be acted on by the control of corresponding individual wheel drives independent of one another and with a driving torque comprising:

an electronic control unit configured to apply a yawing moment to the implement by the asymmetrical control of the individual wheel drives in such a way that a transverse force exerted on the towing vehicle via the rear coupling point builds up in the sense of the attainment of a pre-specified steering behavior of the vehicle combination, wherein proceeding from a real value of a steering angle magnitude, which gives a wheel steering angle, assumed on steerable wheels of the towing vehicle, the electronic control unit determines a theoretical course of a curve path to be traversed, and wherein the application of the yawing moment takes place by the asymmetrical control of the individual wheel drives in accordance with the determined theoretical course.

2. The device of claim 1, wherein proceeding from a sensor-determined real value of a steering angle magnitude, which gives a wheel steering angle, assumed on steerable wheels of the towing vehicle, the electronic control unit calculates a theoretical value of an articulated angle magnitude that is present between the towing vehicle and the implement and compares it with a real value, which is determined by a sensor for the articulated angle magnitude, wherein the application of the yawing moment takes place by the asymmetrical control of the individual wheel drives with the goal of adapting the real value of the articulated angle magnitude to the calculated theoretical value.

3. The device of claim 2, characterized in that the adaptation of the real value of the articulated angle magnitude to the calculated theoretical value takes place by the application of the yawing moment when the vehicle combination is standing still.

4. The device of claim 1, wherein proceeding from a sensor-determined real value of a steering angle magnitude, which gives a wheel steering angle, assumed on steerable wheels of the towing vehicle, and as a function of a sensor-determined real value of a traveling speed magnitude, which gives a forward movement speed of the towing vehicle, the electronic control unit calculates a theoretical value of a yaw rate magnitude, which gives a temporal yaw angle change around the vertical axis of the towing vehicle, wherein the application of the yawing moment takes place by the asymmetrical control of the individual wheel drives with the goal of adapting the real value of the yaw rate magnitude to the calculated theoretical value.

5. The device of claim 1, wherein the electronic control unit is configured to undertake steering operator-independent interventions on the towing vehicle for the application of the yawing moment.

6. The device of claim 1, wherein the application of the yawing moment takes place during the execution of a maneuvering or a turning procedure, in the sense of the attainment of an oversteering behavior of the vehicle combination.

7. The device of claim 6, wherein the maneuvering or turning procedure is controlled by a radio remote control, which communicates with the electronic control unit.

8. The device of claim 1 wherein during execution of a backward movement of the vehicle combination by the activation of a drive torque increase, which is undertaken on both sides of the individual wheel drives, the electronic control unit places the implement in a traction mode.

9. A device for the steering assistance of a vehicle combination having a towing vehicle and an attached implement which swivels on the towing vehicle at a rear coupling point, wherein the implement has wheels that are arranged on opposite sides and that can be acted on by the control of corresponding individual wheel drives independent of one another and with a driving torque comprising:

an electronic control unit configured to apply a yawing moment to the implement by the asymmetrical control of the individual wheel drives in such a way that a transverse force exerted on the towing vehicle via the rear coupling point builds up in the sense of the attainment of a pre-specified steering behavior of the vehicle combination, wherein proceeding from a sensor-determined real value of a steering angle magnitude, which gives a wheel steering angle, assumed on steerable wheels of the towing vehicle, the electronic control unit calculates a theoretical value of an articulated angle magnitude that is present between the towing vehicle and the implement and compares it with a real value, which is determined by a sensor for the articulated angle magnitude, and wherein the application of the yawing moment takes place by the asymmetrical control of the individual wheel drives with the goal of adapting the real value of the articulated angle magnitude to the calculated theoretical value.

10. A device for the steering assistance of a vehicle combination having a towing vehicle and an attached implement which swivels on the towing vehicle at a rear coupling point, wherein the implement has wheels that are arranged on opposite sides and that can be acted on by the control of corresponding individual wheel drives independent of one another and with a driving torque comprising:

an electronic control unit configured to apply a yawing moment to the implement by the asymmetrical control of the individual wheel drives in such a way that a transverse force exerted on the towing vehicle via the rear coupling point builds up in the sense of the attainment of a pre-specified steering behavior of the vehicle combination, wherein proceeding from a sensor-determined real value of a steering angle magnitude, which gives a wheel steering angle, assumed on steerable wheels of the towing vehicle, and as a function of a sensor-determined real value of a traveling speed magnitude, which gives a forward movement speed of the towing vehicle, the electronic control unit calculates a theoretical value of a yaw rate magnitude, which gives a temporal yaw angle change around the vertical axis of the towing vehicle, and wherein the application of the yawing moment takes place by the asymmetrical control of the individual wheel drives with the goal of adapting the real value of the yaw rate magnitude to the calculated theoretical value.

* * * * *